United States Patent [19]

Sanbayashi

[11] Patent Number: 4,967,235

[45] Date of Patent: Oct. 30, 1990

[54] IMAGE FORMATION APPARATUS FOR DISPLAYING OR RECORDING A PRE-SELECTED IMAGE AREA OF A FILM

[75] Inventor: Takeshi Sanbayashi, Tokyo, Japan

[73] Assignee: Kabushiki Kaisha Toshiba, Kawasaki, Japan

[21] Appl. No.: 277,691

[22] Filed: Nov. 29, 1988

[30] Foreign Application Priority Data

Nov. 30, 1987 [JP] Japan .............................. 62-302682
Nov. 30, 1987 [JP] Japan .............................. 62-302693
Nov. 30, 1987 [JP] Japan .............................. 62-302695

[51] Int. Cl.$^5$ ........................................... G03G 15/00
[52] U.S. Cl. ..................................... 355/271; 355/268
[58] Field of Search ............... 356/271, 202, 218, 244, 356/268

[56] References Cited

U.S. PATENT DOCUMENTS 4,708,464 11/1987 Otsuki et al. ..................... 355/271 X
4,745,489 5/1988 Kashiwagi et al. ............. 355/271 X

FOREIGN PATENT DOCUMENTS 62-242927 10/1987 Japan .................................. 355/271

Primary Examiner—R. L. Moses
Attorney, Agent, or Firm—Foley & Lardner, Schwartz, Jeffery, Schwaab, Mack, Blumenthal & Evans

[57] ABSTRACT

An image of a microfilm is projected on a screen by light emitted from a light source. A pair of cursors are provided on each of adjacent sides of the screen so that a desired area of the image displayed on the screen can be designated by moving the cursors. A rotary mirror for scanning the image of the microfilm is arranged between the microfilm and the screen. The image of the microfilm is guided to a photosensitive drum by the mirror. A shutter is located between the photosensitive drum and the mirror. By controlling the shutter and the light source in accordance with an area designated by the cursors, an image of the microfilm corresponding to the designated area can be formed on the photosensitive drum.

23 Claims, 12 Drawing Sheets

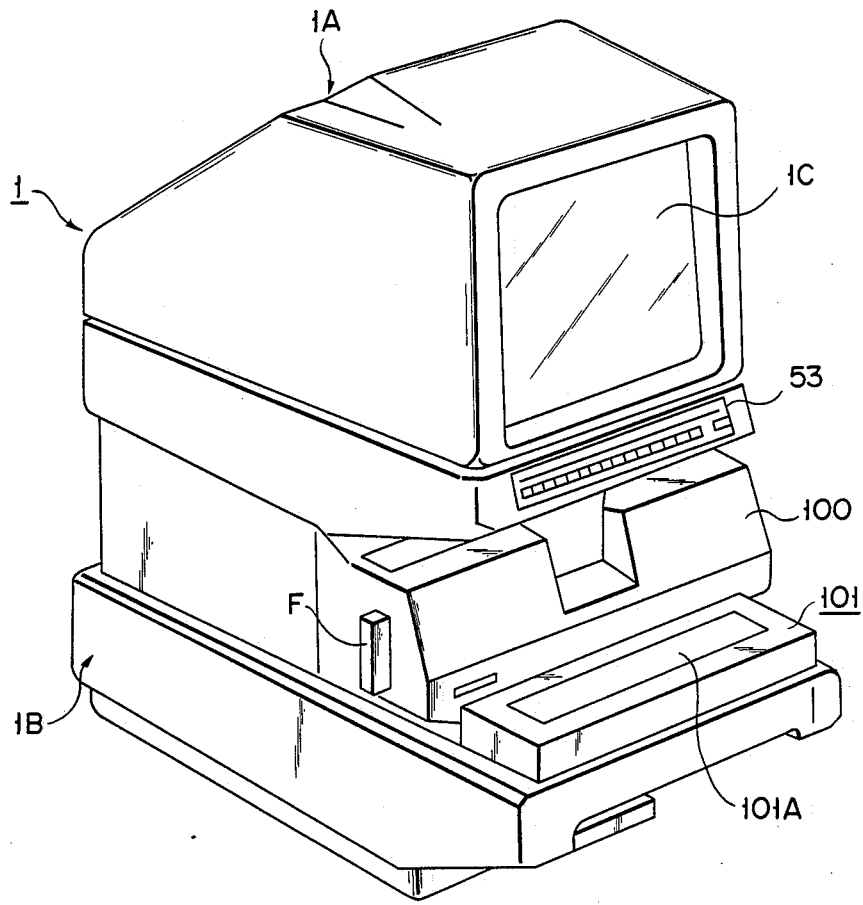
F I G. 1

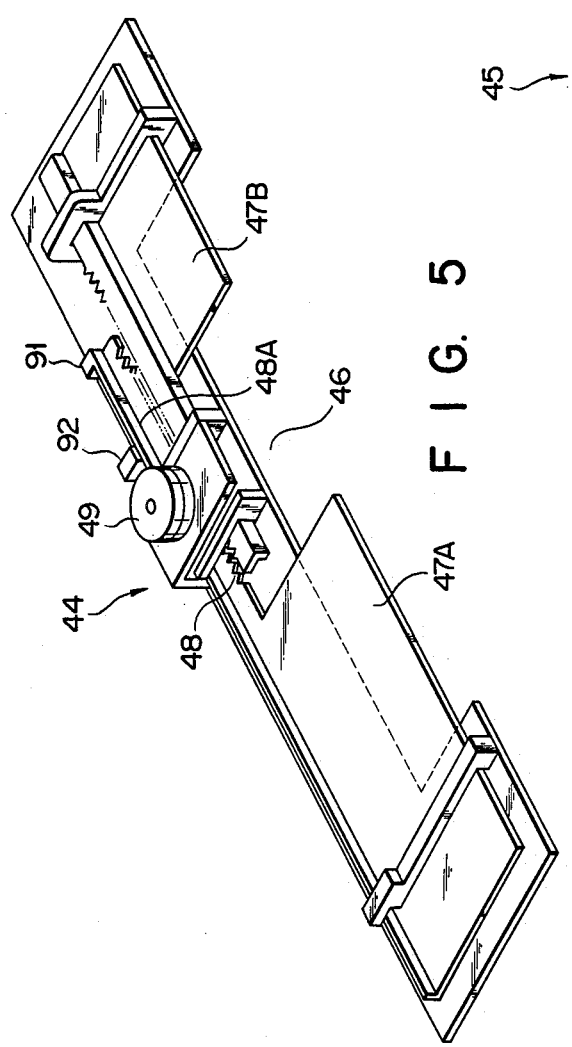
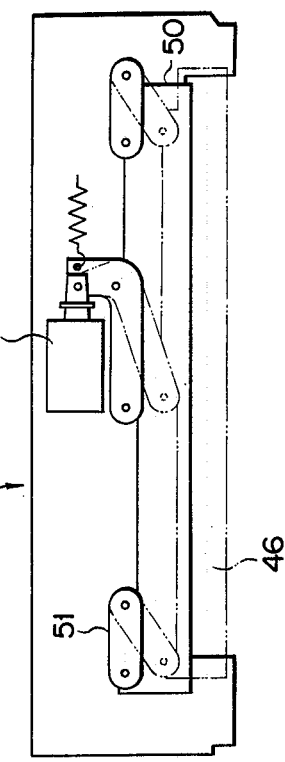
FIG. 5
FIG. 6

IMAGE FORMATION APPARATUS FOR DISPLAYING OR RECORDING A PRE-SELECTED IMAGE AREA OF A FILM

BACKGROUND OF THE INVENTION

1. Field of the Invention

The present invention relates to a microfilm reader/printer capable of projecting information recorded in a microfilm onto a screen or copying the information projected on the screen onto paper, in particular, an image formation apparatus for forming information on film-like recording medium, capable of copying only information of a designated area of the information projected on the screen.

2. Description of the Related Art

A microfilm reader/printer is known as an apparatus for copying information recorded in a microfilm on paper. The microfilm reader/printer projects information recorded in a microfilm onto a screen in an enlarged scale and copies the information projected on the screen onto paper by an image formation apparatus.

The microfilm reader/printer of this type, however, simply copies the information projected on the screen onto the paper by the image formation apparatus. Therefore, if unnecessary information is included in the information projected on the screen, this unnecessary information is also copied.

The image formation apparatus in the microfilm reader/printer has a first image forming mode for forming a positive print from a negative image and a second image forming mode for forming a positive print from a positive image. In the first image recording mode, reversing development is performed. In this reversing development, areas before a leading edge and after a trailing edge of an effective image are unnecessarily developed. For this reason, in the first image forming mode, an unnecessary portion is formed in the formed image.

Therefore, a demand has arisen for an apparatus capable of designating a necessary area of information projected on a screen and supplying information only of a portion of a microfilm corresponding to the designated area, thereby forming the information of only the necessary portion.

Various pieces of operation information set in the first and second image recording modes are stored in, e.g., a RAM (Random Access Memory). The contents of the RAM are, however, reset when a mode is switched or a power source is switched off. Therefore, when the preceding mode is switched or the power source is switched on, the predetermined operation information must be reset.

Therefore, even when a substantially fixed designated area is used in order to, e.g., erase the unnecessary areas before the leading edge and after the trailing edge of the effective image, the area must be designated whenever the image recording mode is switched from, e.g., the second mode to the first one or the power source is switched on, resulting in very troublesome operation.

The microfilm reader/printer is connected to an additional apparatus called, e.g., a page searcher.

The page searcher searches for a necessary image from a belt-like continuous microfilm or inputs a command for copying an image projected on a screen onto paper.

Assume that the operation of designating a necessary area from an image projected on a screen can be performed from only a microfilm reader/printer main body. In this case, after the page searcher searches for a necessary image, an operation of designating the necessary area from the image displayed on the screen is performed using an operation panel of the microfilm reader/printer, and then a copying command is inputted from the operation panel of the microfilm reader/printer or the page searcher. That is, both the page searcher and the operation panel of the microfilm reader/printer must be operated, resulting in poor operability.

SUMMARY OF THE INVENTION

It is, therefore, an object of the present invention to provide an image formation apparatus having an image edit function capable of designating an unnecessary portion of an image on a microfilm and forming only a necessary image on a transfer material.

It is a second object of the present invention to provide an image formation apparatus in which even when a first image forming mode is switched to a second image forming mode or a power source is switched off, set operation information are not cleared, and when the mode is switched again or the power source is switched on, a predetermined operation can be immediately performed, thereby improving operability.

It is a third object of the present invention to provide an image formation apparatus in which an image formation range can be designated from both an operation panel mounted on an image formation apparatus main body and an additional apparatus connected to the image formation apparatus main body.

The above first object of the present invention can be achieved by an image formation apparatus comprising means on which information has been recorded, display means for displaying the information recorded on the recording means, designating means for designating an arbitrary area of the display means, scanning means for emitting light to optically scanning the information recorded in the recording means, image-forming means for forming an image of the information based on the scanning light guided by the scanning means, and control means for interrupting the scanning light guided from the scanning means to the image-forming means in accordance with the area designated by the designating means.

The above second object of the present invention can be achieved by an image formation apparatus comprising means on which an image has been recorded, display means for displaying the image recorded on the recording means, designating means for designating an arbitrary area of the display means, first image-forming means for forming an image recorded in the recording means through first forming process, second image-forming means for forming an image recorded in the recording means through a second forming process, selecting means for selecting the first forming means or the second forming means, memory means for storing information of the area designated by the designating means, and moving means for moving the designating means in accordance with information of the area stored in the memory means to display the area when the first image-forming means is selected by the selecting means.

The above third object of the present invention can be achieved by an image formation apparatus comprising display means for displaying display information, designating means for designating an arbitrary area of the display means, first operating means, mounted on the display means, for instructing a designated position of the designating means, changing means, connected to the display means, for changing the display information displayed on the display means, and second operating means, mounted on the changing means, for instructing a designated position of the designating means.

BRIEF DESCRIPTION OF THE DRAWINGS

FIG. 1 is a perspective view showing an outer appearance of a microfilm reader/printer adopting the present invention;

FIG. 5 is a perspective view showing an arrangement of a side shutter mechanism;

FIG. 6 is a plan view showing an arrangement of a full-face shutter mechanism;

FIG. 12 is a flow chart for explaining an operation performed when a power source is switched on;

DETAILED DESCRIPTION OF THE PREFERRED EMBODIMENT

An embodiment of the present invention will be described below with reference to the accompanying drawings.

In FIG. 1, microfilm reader/printer main body 1 comprises projector unit 1A and image formation unit 1B. On the front surface of unit 1A, screen 1C on which a microfilm image is projected in an enlarged scale and operation panel 53 including various operation keys are mounted. Film handler 100 and page searcher (peripheral apparatus) 101 are mounted below panel 53. Film cartridge F is mounted in handler 100. A belt-like microfilm is wound and housed in cartridge F.

Handler 100 extracts the microfilm information carrying medium) housed in cartridge F and causes the film to run along handler 100 to the right side of FIG. 1 on the basis of an operation performed on operation panel 101A mounted on searcher 101. The microfilm can be fed one frame after another or a plurality of frames at the same time in accordance with an operation performed on the operation panel.

Figure 2:
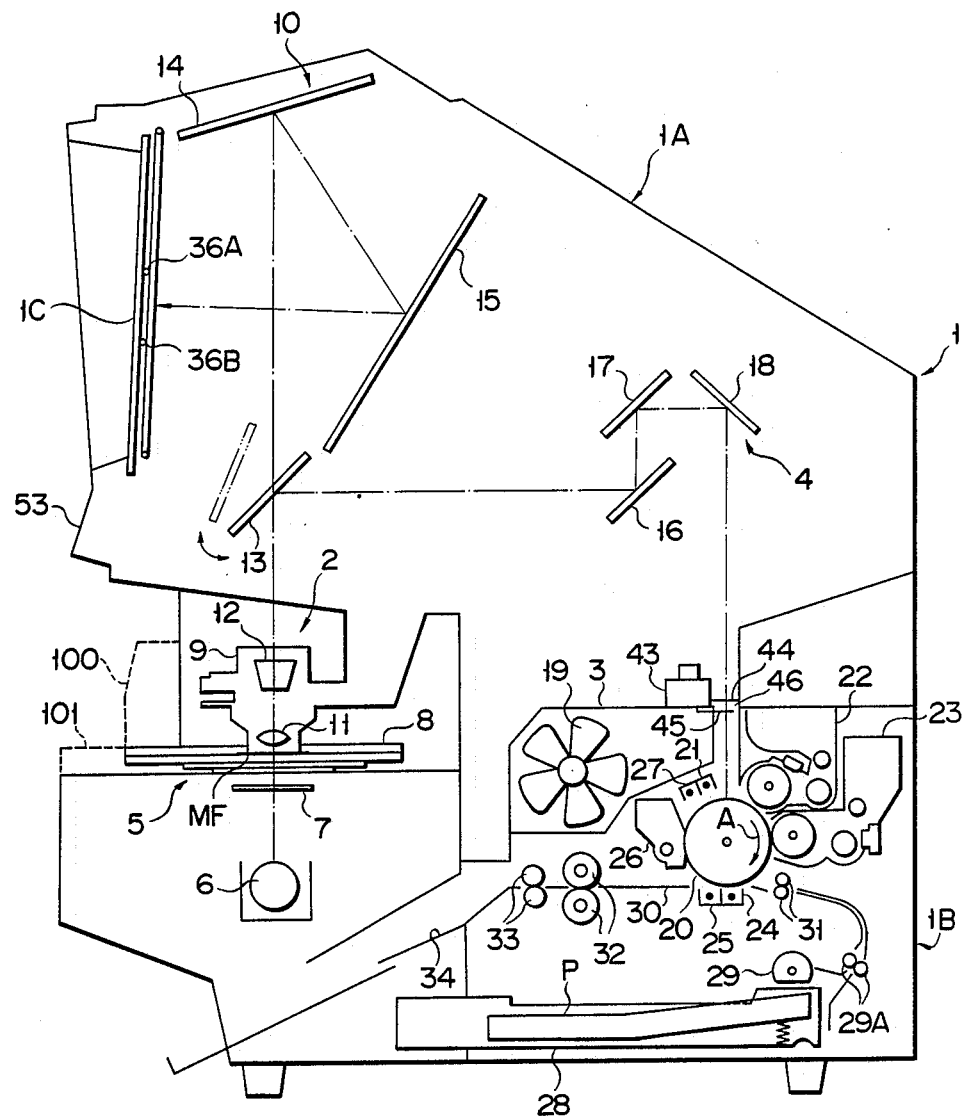
FIG. 2 is a sectional view showing a schematic arrangement of the microfilm reader/printer.

FIG. 2 shows an internal arrangement of main body 1. Projector unit 1A incorporates film set unit 5 for setting film MF extracted from cartridge F, projecting unit 2 for projecting an image in film MF set in unit 5, and projecting light guiding/scanning unit 4 for guiding/scanning projecting light from unit 2 to image formation unit 1B.

Film set unit 5 includes film holding member 8 for holding film MF extracted from cartridge F.

Projecting unit 2 comprises light source 6 mounted below member 8, Fresnel lens 7 arranged above light source 6, lens holder unit 9 mounted above member 8, and screen projecting unit 10 mounted behind screen 1C. Light (to be referred to as projecting light hereinafter) passing through film MF is guided to screen 1C through lens holder unit 9 and screen projecting unit 10.

Unit 9 includes objective lens 11 and prism 12. Objective lens 11 is moved in an optical axis direction of the projecting light to focus the image of film MF to be projected on screen 1C.

Prism 12 is rotatably held by unit 9. An image to be projected on screen 1C can be inverted by rotating prism 12 through 180° about the optical axis of the projecting light.

Screen projecting unit 10 comprises movable mirror 13 and first and second fixed mirrors 14 and 15. The projecting light passing through prism 12 is reflected by mirrors 14 and 15 so that the image of film MF is enlarged and projected on screen 1C.

In order to project the image of film MF on screen 1C, movable mirror 13 is located outside an optical path (screen projecting position) of the projecting light as indicated by an alternate long and two dashed line in FIG. 2 so as not to interfere with the projecting light incident from lens holder unit 9 to first fixed mirror 14.

In order to copy the image of film MF projected on screen 1C onto paper, mirror 13 is inserted in the optical path (printing position) of the projecting light as indicated by a solid line in FIG. 2. Therefore, the projecting light from unit 9 is radiated on photosensitive drum 20 of image formation unit 1B through movable mirror 13 and third to fifth fixed mirrors 16, 17 and 18 constituting projecting light guiding/scanning unit 4.

In this copying operation, mirror 13 is pivoted in an arrow direction to optically scan the image of film MF.

Image formation unit 1B is separated from projector unit 1A by partition 3. Cooling fan 19 is mounted at the upper left portion of unit 1B. Drum 20 is located at a substantially central portion of unit 1B. Around drum 20, charger 21, normal developing unit 22, reversing developing unit 23, transfer charger 24, separating charger 25, cleaning unit 26 and discharger 27 are disposed along a rotational direction (arrow A in FIG. 2) of drum 20.

Paper feed cassette 28 for housing paper P is located below drum 20. Paper feed roller 29 for extracting paper P housed in cassette 28 and convey roller pair 29A for conveying the paper extracted by roller 29 are located near cassette 28. The paper conveyed by roller pair 29A is fed between drum 20 and charger 24 by resist roller pair 31. Convey path 30 for guiding paper on which an image is transferred is formed between charger 24 and paper discharge tray 34. Roller pair 31 is located at the upstream side of path 30 and heat roller pair 32 as a fixing unit and paper discharge roller pair 33 are located at the downstream side thereof.

Figure 3A:
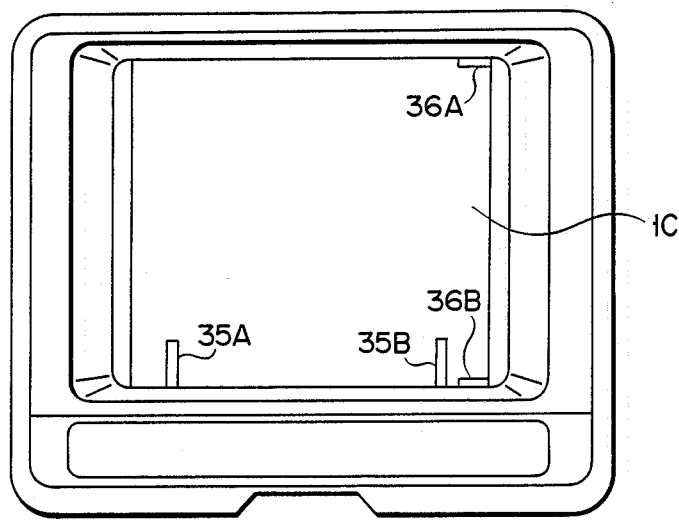
FIGS. 3A and 3B are front views showing a screen.
Figure 3B:
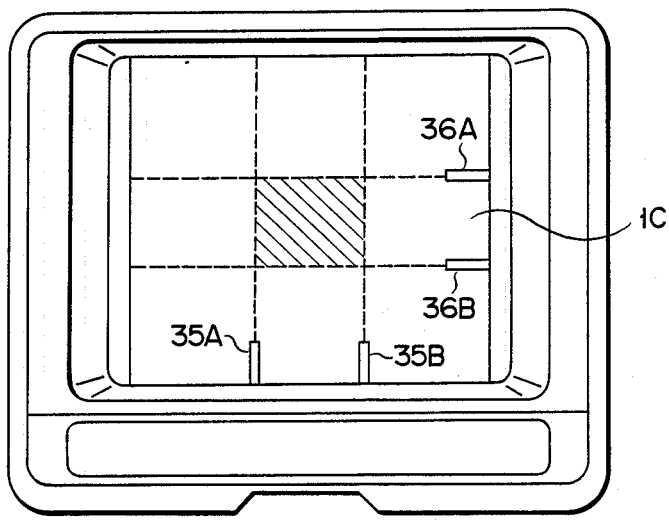

As shown in FIGS. 3A and 3B, screen 1C includes cursors 35A, 35B, 36A and 36B for designating a copying area (hatched portion S in FIG. 3B) of a projected image. Cursors 35A and 35B can horizontally move on screen 1C and cursors 36A and 36B can vertically move thereon.

Figure 4:
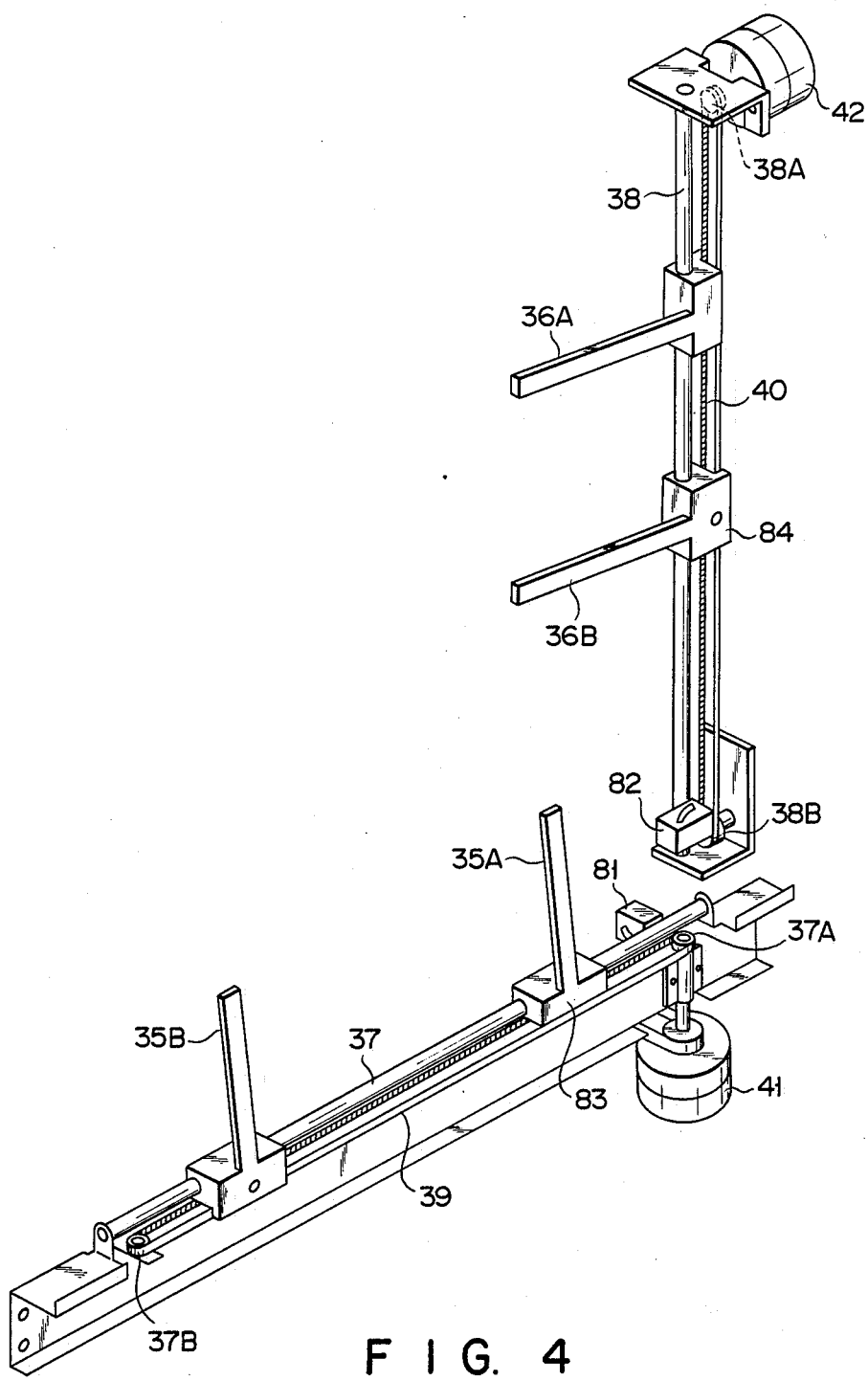
FIG. 4 is a perspective view showing an arrangement of cursors.

FIG. 4 shows an arrangement of cursors 35A, 35B, 36A and 36B. Guide shafts 37 and 38 are formed horizontally and vertically with respect to screen 1C, respectively. Cursors 35A and 35B are slidably mounted on shaft 37, and cursors 36A and 36B are slidably mounted on shaft 38. Pulleys 37A and 37B are mounted near both ends of shaft 37, and pulleys 38A and 38B are mounted near both ends of shaft 38. Timing belt 39 is looped between pulleys 37A and 37B, and timing belt 40 is looped between pulleys 38A and 38B. Belt 39 is driven by pulse motor 41 for driving pulley 37A, and belt 40 is driven by pulse motor 42 for driving pulley 38A. Cursors 35A and 35B are fixed to belt 39, and cursors 36A and 36B are fixed to belt 40. Cursors 35A to 36B are moved close to or away from each other by driving motors 41 and 42.

Micro switch 81 for detecting initial positions (home positions) of cursors 35A and 35B is mounted near pulley 37A on shaft 37. That is, when cursor 35A is moved and holding portion 83 of cursor 35A abuts against switch 81, switch 81 is turned on to detect that cursors 35A and 35B are moved to their home positions.

Similarly, micro switch 82 for detecting home positions of cursors 36A and 36B is mounted near pulley 38B on shaft 38. That is, when cursor 36A is moved and holding portion 84 of cursor 36A abuts against switch 82, switch 82 is turned on to detect that cursors 36A and 36B are moved to their home positions.

As shown in FIG. 2, shutter device 43 is located above drum 30 and in an optical path connecting drum 20 and fifth fixed mirror 18. Device 43 consists of side shutter mechanism 44 and full-face shutter mechanism 45 both for closing slit 46 formed in partition 3. Mechanism 44 operates in accordance with a moving amount of cursors 35A and 35B, while mechanism 45 operates in accordance with a moving amount of cursors 36A and 36B.

FIG. 5 shows side shutter mechanism 44. Mechanism 44 comprises a pair of side shutters 47A and 47B sliding along the longitudinal direction of slit 46, rack and pinion mechanism 48 for sliding shutters 47A and 47B, and pulse motor 49 for driving mechanism 48. Slide shutters 47A and 47B are slid in accordance with a moving amount of cursors 35A and 35B (the number of steps of motor 41).

Rack 48A of mechanism 48 includes detecting member 91. Micro switch 92 for detecting home positions of shutters 47A and 47B is located near motor 49. When shutters 47A and 47B are moved by motor 49 and mechanism 48 and member 91 abuts against switch 92, switch 92 is turned on to detect that shutters 47A and 47B are moved to their home positions.

FIG. 6 shows full-face shutter mechanism 45. Mechanism 45 comprises full-face shutter 50, link mechanism 51 for opening/closing shutter 50, and solenoid 52 for driving link mechanism 51. Shutter 50 is opened/closed in accordance with a moving amount of cursors 35A and 35B (the number of steps of motor 42).

Figure 7:
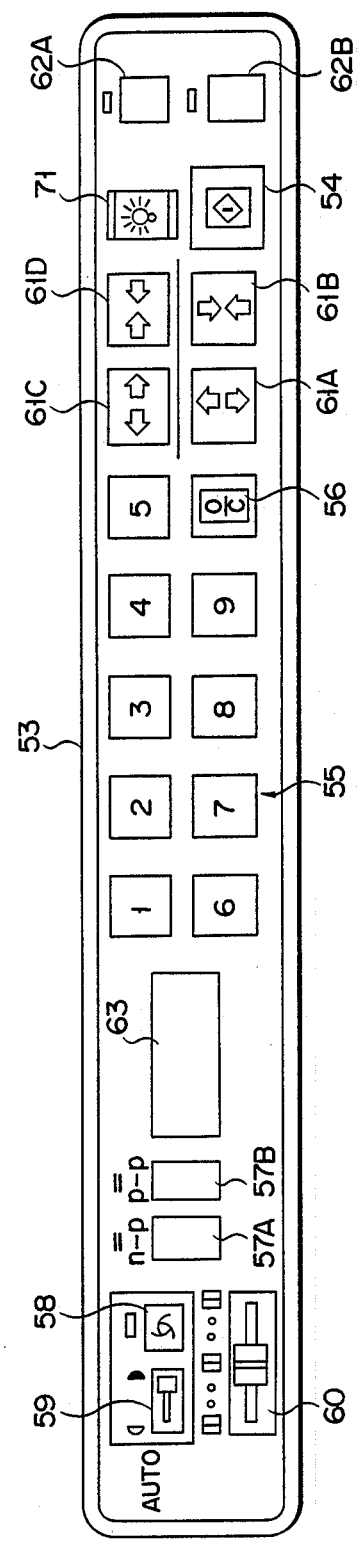
FIG. 7 is a plan view showing an arrangement of an operation panel.

FIG. 7 shows operation panel 53. Panel 53 includes copy start key 54, ten keys 55 for setting the number of copies, clear stop key 56, negative-positive (N-P) mode key 57A, positive-positive (P-P) mode key 57B, automatic exposure key 58, exposure amount adjusting volume 59, copy density adjusting volume 60, cursor operation keys 61A, 61B, 61C and 61D, cursor speed switching keys 62A and 62B, power saving key 71, and display unit 63.

Keys 61A, 61B, 61C and 61D are for moving cursors 35A, 35B, 36A and 36B horizontally or vertically on screen 1C. Keys 62A and 62B are for switching the moving speed of cursors 35A, 35B, 36A and 36B between high- and low-speed modes.

Key 57A is for instructing positive printing from a microfilm of a negative image. Key 57B is for instructing positive printing from a microfilm of a positive image.

Figure 8:
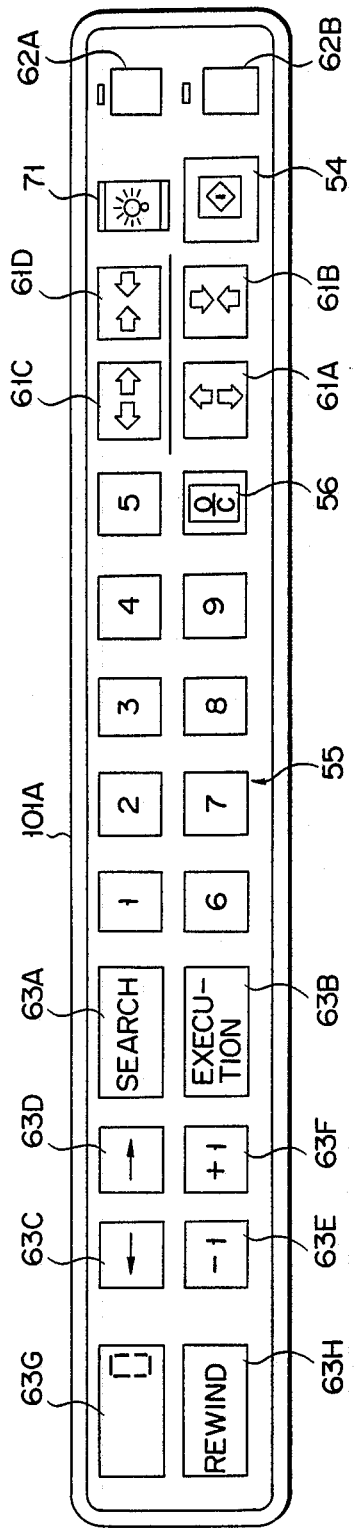
FIG. 8 is a plan view showing an arrangement of an operation panel mounted on a page searcher.

FIG. 8 shows operation panel 101A mounted on page searcher 101. In FIG. 8, the same reference numerals as of operation panel 53 denote the same parts, and only different parts will be described.

Search key 63A is a key for designating a frame search mode, and execution key 63B is a key for instructing execution of an operation. In order to perform a frame search operation, key 63A is depressed to designate the frame search mode. In this state, a desired page number, for example, is inputted from ten keys 55 and then key 63B is depressed. As a result, a microfilm corresponding to the input page number is searched.

Random feed keys 63C and 63D are keys for randomly feeding a microfilm in a right or left direction of FIG. 8. One-frame feed keys 63E and 63F are keys for feeding a microfilm one frame after another in the right or left direction of FIG. 8.

Display unit 63G displays the number of copies or various pieces of information in the copy or search operation. Rewind key 63H is a key for rewinding an extracted microfilm in the film cartridge.

Figure 9:
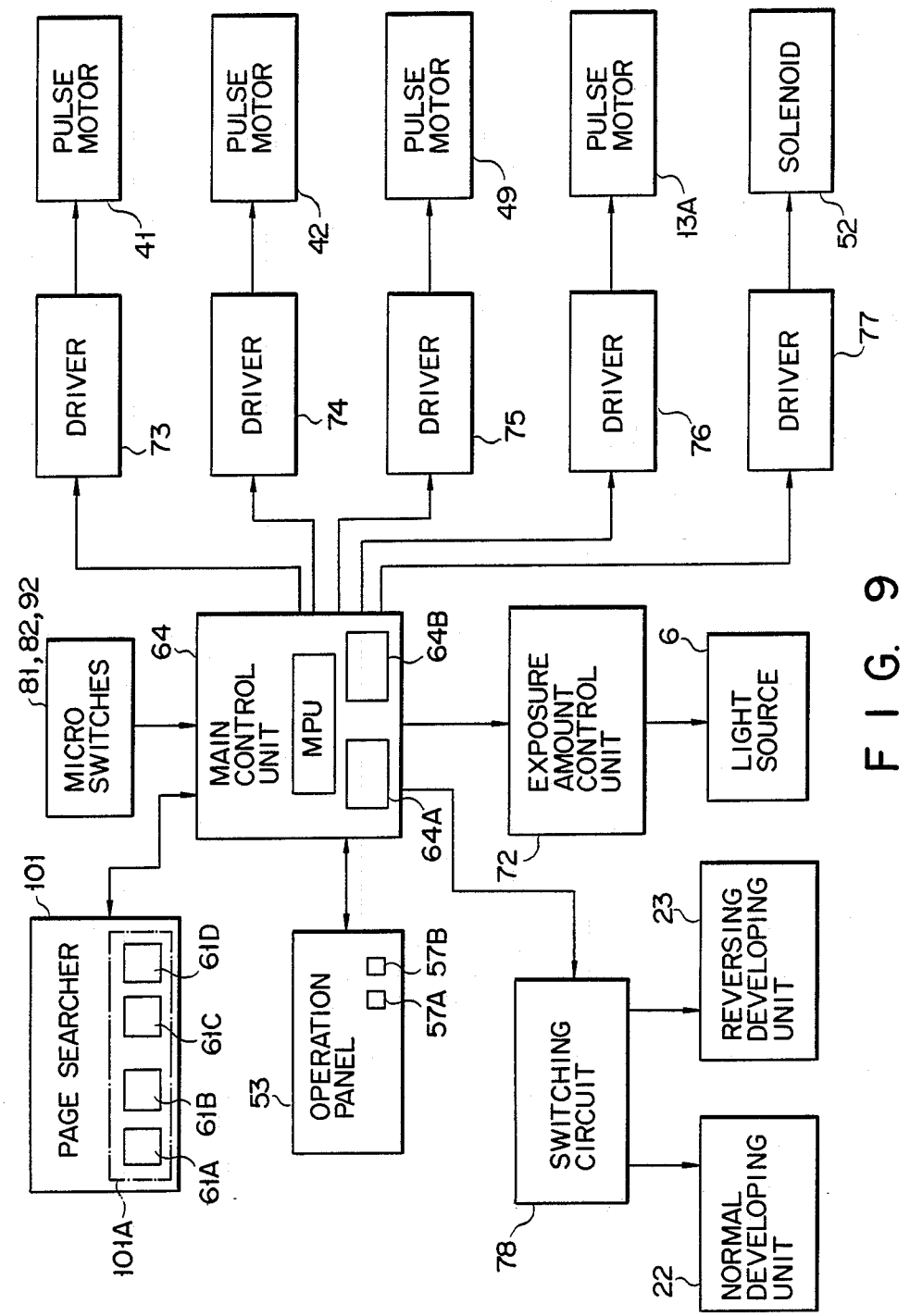
FIG. 9 is a block diagram showing an arrangement of a controller.

FIG. 9 shows a controller of the microfilm reader/printer. Main control unit 64 comprises mask memory 64A as a volatile memory, backup memory 64B as a non-volatile memory, and a microprocessor (MPU). Unit 64 is connected to peripheral devices such as page searcher 101, operation panel 53, switching circuit 78 for selecting normal developing unit 22 or reversing developing unit 23, and micro switches 81, 82 and 92. Unit 64 is also connected to pulse motors 41, 42 and 49, pulse motor 13A for driving movable mirror 13, and solenoid 52 through drivers 73, 74, 75, 76 and 77, respectively, and to exposure amount control unit 72 for adjusting a light amount of light source 6 in accordance with the density of a microfilm.

When key 57A on panel 53 is depressed to set the N-P mode, main control unit 64 selects development performed by reversing developing unit 23. When key 57B is depressed to set the P-P mode, unit 64 selects development performed by normal developing unit 22.

When the N-P mode is switched to the P-P mode, unit 64 clears a masking function, i.e., initializes cursors 35A, 35B, 36A and 36B and slide shutters 47A and 47B (moves them to their initial positions or home positions), thereby disabling inputs from keys 61A, 61B, 61C and 61D.

When an area to be copied is designated by cursors 35A, 35B, 36A and 36B in the N-P mode, unit 64 stores the area to be copied in mask memory 64A. The contents of memory 64A are not cleared even when the N-P mode is switched to the P-P mode. When the P-P mode is switched to the N-P mode, unit 64 reads out the contents of memory 64A and moves cursors 35A, 35B, 36A and 36B on the basis of the readout contents, thereby recovering the area to be copied designated in the preceding N-P mode. That is, cursors 35A, 35B, 36A and 36B are moved to positions indicating the area to be copied on the basis of the contents of memory 64A.

When the power source is switched off, the contents of memory 64A are stored in backup memory 64B by unit 64. The contents of memory 64B are stored in memory 64A when the power source is switched on.

Switching circuit 78 selects development performed by normal developing unit 22 or that performed by reversing developing unit 23. Circuit 78 performs switching by moving a rotary sleeve (not shown) in each of units 22 and 23 close to/away from photosensitive drum 20 (i.e., moving the unit itself) or by applying/not applying a developing bias thereto.

Page searcher 101 supplies the following signals to unit 64: a page search ON signal representing that page search is being executed; a cartridge mount signal representing that the presence/absence of a cartridge; a print request signal (image formation request signal) for instructing copy start; a page searcher connection signal representing a connection state of page searcher 101; and cursor position signals representing positions of cursors 35A, 35B, 36A and 36B corresponding to operations of keys 61A, 61B, 61C and 61D, respectively. Unit 64 supplies a print operation ON signal representing that copying is being executed, an error signal representing that an error is caused, and a count signal to page searcher 101.

Figure 10:
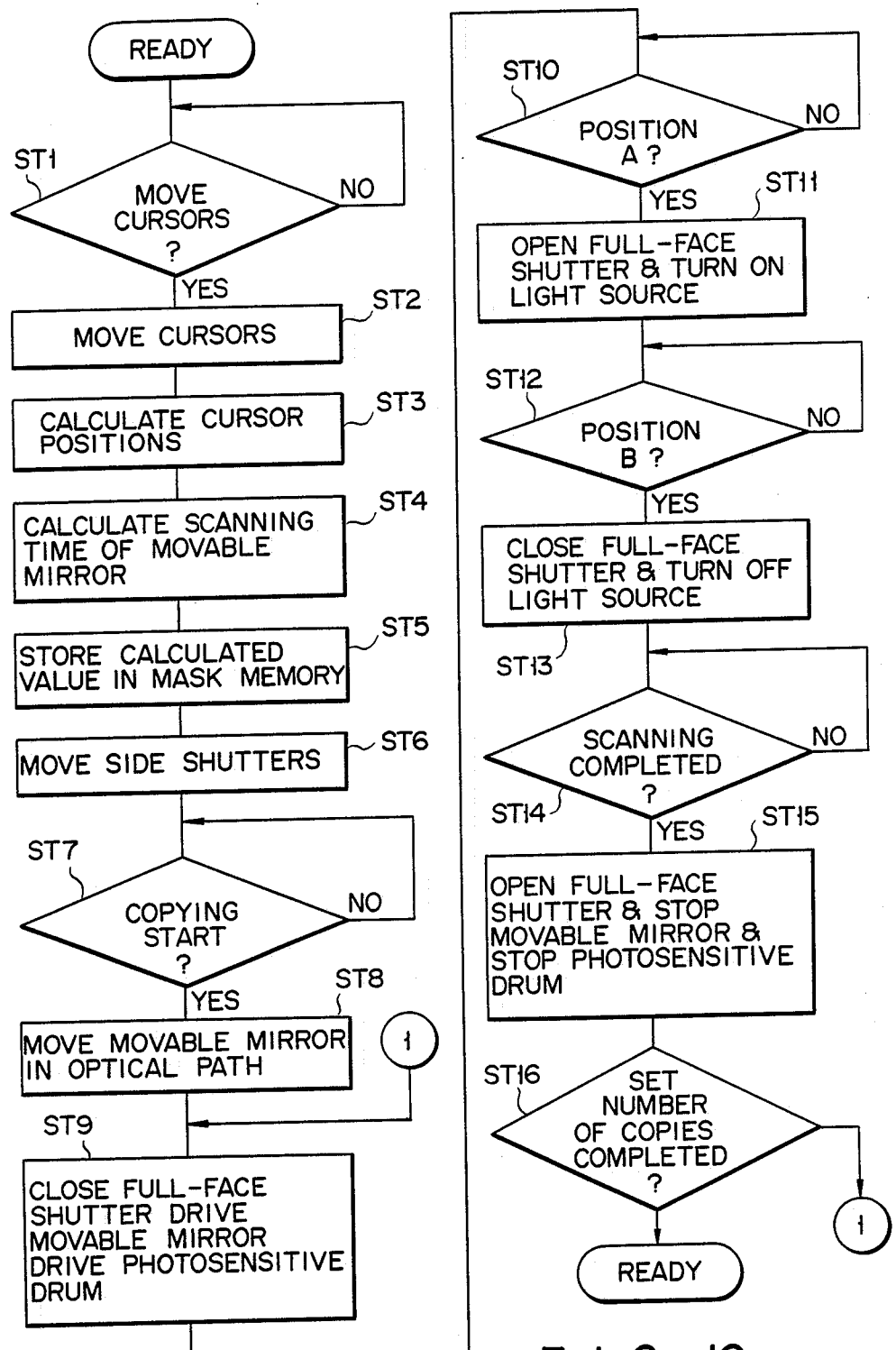
FIG. 10 is a flow chart for explaining a masking copying operation.

Referring to FIG. 10, a masking function for copying an image of only a desired portion of an image projected on screen 1C performed in the above arrangement will be described below. In this case, assume that an image of a desired microfilm searched by operating operation panel 101A of page searcher 101 is projected on screen 1C and the negative-positive (N-P) mode is set. Therefore, reversing developing unit 23 faces drum 20.

In this state, when keys 61A to 61D on panel 53 are operated (step ST1), motors 41 and 42 are driven in accordance with the key operation to move cursors 35A, 35B, 36A and 36B to an image area to be recorded (hatched portion in FIG. 3B) as shown in FIG. 3B (step ST2). At this time, by depressing cursor speed switching key 62A or 62B, the moving speed of cursors 35A, 35B, 36A and 36B is switched to the high- or low-speed mode, and therefore the area to be copied can be accurately designated in a short time period.

When the area to be copied is set as described above, main control unit 64 calculates the positions of cursors 35A, 35B, 36A and 36B on screen 1C from the number of motor drive pulses to motors 41 and 42 (step ST3).

Figure 11:
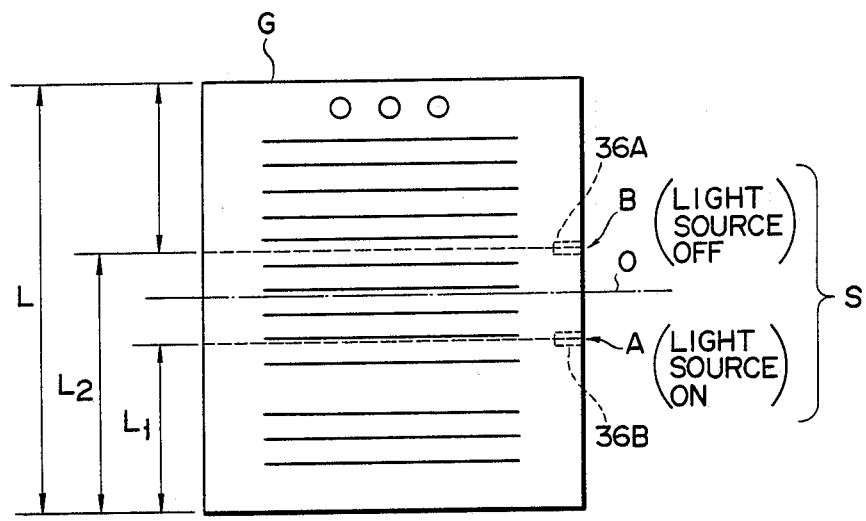
FIG. 11 is a schematic view for explaining a masking copying operation.

The positions of cursors 36A and 36B are obtained as lengths $L_2$ and $L_1$ as shown in FIG. 11. In this case, since image G is copied from its lower end in the following image copy operation, positions A and B of cursors 36B and 36A represent an exposure start position and an exposure end position with respect to drum 20, respectively.

Unit 64 also calculates in advance a time interval from a timing at which rotary mirror 13 starts scanning of the image of film MF to a timing at which mirror 13 reaches the position designated by cursors 36A and 36B. That is, since an image scanning length per unit time associated with rotation of mirror 13 is obtained from a rotational speed of motor 13A for driving mirror 13, an image scanning time from the scanning start position to the position designated by cursor 36B can be calculated by dividing an image scanning length from the scanning start position to the designated position by the rotational speed of mirror 13 (step ST4). The positions of cursors 35A to 36B and the scanning time of mirror 13 are stored in mask memory 64A (step ST5).

Thereafter, motor 49 is driven to move side shutters 47A and 47B to positions corresponding to the positions designated by cursors 35A and 35B, respectively (step ST6).

When copy start key 54 is operated after the area to be copied is designated (step ST7), mirror 13 is moved from the position indicated by the alternate long and two dashed line to the position indicated by the solid line as shown in FIG. 2, thereby guiding the projecting light from lens holder unit 9 to projecting light guiding/scanning unit 4 (step ST8). At the same time, solenoid 52 is turned on to drive motor 13A, and drum 20 and mirror 13 are rotated in synchronism with each other to start scanning of film MF. At a timing at which image scanning is started, however, exposure to drum 20 is not performed because light source 6 is switched off by control of exposure amount control unit 72 (step ST9).

Thereafter, when unit 64 determines that the image scanning position of mirror 13 on film MF reaches lower end position A of the area to be copied designated by cursor 36B (step ST10), light source 6 is turned on by unit 72, and solenoid 52 is turned off to open full-face shutter 50 (step ST11). Therefore, scanning light corresponding to the image of the microfilm is guided from scanning light slit 46 to drum 20. As a result, the image of film MF is formed on the surface of drum 20.

When unit 64 determines that the image scanning position of mirror 13 on the microfilm reaches upper end position B of the area to be copied designated by cursor 36A (step ST12), light source 6 is turned off by unit 72, and solenoid 52 is turned on to close full-face shutter 50 (step ST12). As a result, exposure to drum 20 is interrupted.

When copying is started, drum 20 is uniformly charged by charger 21 and exposed by the scanning light from unit 4, thereby forming an electrostatic latent image on the surface of drum 20. This image is developed to be a toner image by reversing developing unit 23.

Paper P extracted from paper feed cassette 28 by paper feed roller 29 is conveyed to an image transfer portion between drum 20 and transfer charger 24 by resist roller pair 31, and the toner image is transferred on paper P by charger 24.

Then, paper P having the toner image transferred thereon is separated from drum 20 by separating charger 25 and discharged to paper discharge tray 34 by paper discharge roller pair 33 after the transferred image is melted and fixed by heat roller pair 32.

An after image remaining on drum 20 after the toner image is transferred on paper P is erased by cleaning unit 26 and discharger 27, thereby preparing for the next copy.

When the copying operation on one sheet of paper is completed as described above (step ST14), shutter 50 is opened and mirror 13 and drum 20 are stopped (step ST15). If unit 64 determines that the set number of copies are not completely formed (step ST16), the flow returns to step ST9 to repeat the identical operation. If a copying operation of the set number of copies is completed, a ready state is set.

According to the above microfilm reader/printer, a desired microfilm image is projected on screen 1C and a desired area of the projected image is designated by cursors 35A to 36B so that only an image of the designated area is copied. Therefore, only necessary portions of the projected image can be edited and copied.

In the copying operation, light source 6 is turned on/off in correspondence with an area to be copied designated on screen 1C. Therefore, only the required area to be copied can be easily copied without frequently controlling the shutter unit.

In the above embodiment, light source 6 is turned on in correspondence with the area to be copied designated by cursors 36A and 36B so that only the designated image area is copied. However, if exposure amount control unit 72 is controlled such that light source 6 is kept on to lower end position A of area S shown in FIG. 3B, kept off from position A to upper end position B, and turned on from position B, a portion other than the designated area to be copied except for only an unnecessary image area can be copied and printed (trimming).

If light source 6 is turned on/off in correspondence with the designated area, a plurality of portions in the displayed image can be selectively copied and printed (trimming or masking).

Figure 12:
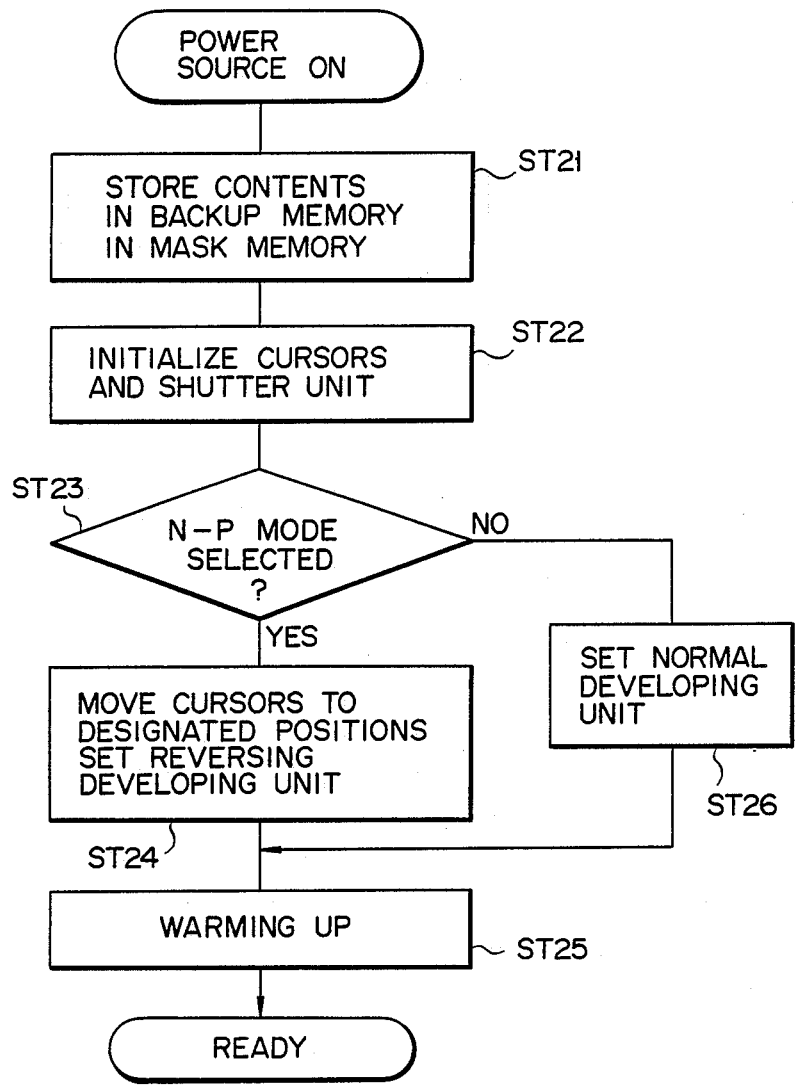

Referring to FIG. 12, an operation to be performed when the power source of the microfilm reader/printer main body is switched on will be described. When the power source of the reader/printer is switched on, main control unit 64 reads out the contents of backup memory 64B and stores them in mask memory 64A (step ST21). In this case, memory 64B already stores the contents stored in memory 64A when the power source is switched off, i.e., an area to be copied designated by cursors 35A, 35B, 36A and 36B in copying only a desired portion of an image projected on screen 1C in a preceding negative-positive (N-P) mode.

Then, unit 64 initializes cursors 35A, 35B, 36A and 36B and slide shutters 47A and 47B to move them to their initial positions (step ST22).

In this state, if N-P mode key 57A on operation panel 53 is depressed, unit 64 determines that the N-P mode is set (step ST23). Therefore, unit 64 controls switching circuit 78 so that reversing developing unit 23 opposes photosensitive drum 20 and moves cursors 35A, 35B, 36A and 36B in accordance with the contents of memory 64A so that the area to be copied designated in the preceding N-P mode is displayed on the display surface of screen 1C (step ST24).

Then, after warming up of heat roller pair 32 and the like is performed, the ready state in which various key operations can be performed is set (step ST25).

If key 57A on panel 53 is not depressed, unit 64 determines that a positive-positive (P-P) mode is set and controls circuit 78 so that normal developing unit 22 opposes drum 20. In addition, unit 64 disables inputs from cursor operation keys 61A to 61D (step ST26). Thereafter, warming up of heat roller pair 32 and the like is performed and then the ready state is set to enable various key operations.

As described above, since cursors 35A to 36B can be moved to the predetermined positions by only switching on the power source of the microfilm reader/printer, a designating operation of the cursors can be omitted. Therefore, the area to be copied need not be reset each time the power source is switched off to, e.g., release paper jamming and switched on again, resulting in good operability.

This function is convenient especially when a substantially fixed area to be copied is used, e.g., when a black frame formed around an image copied from an image displayed on screen 1C is to be erased.

Figure 13:
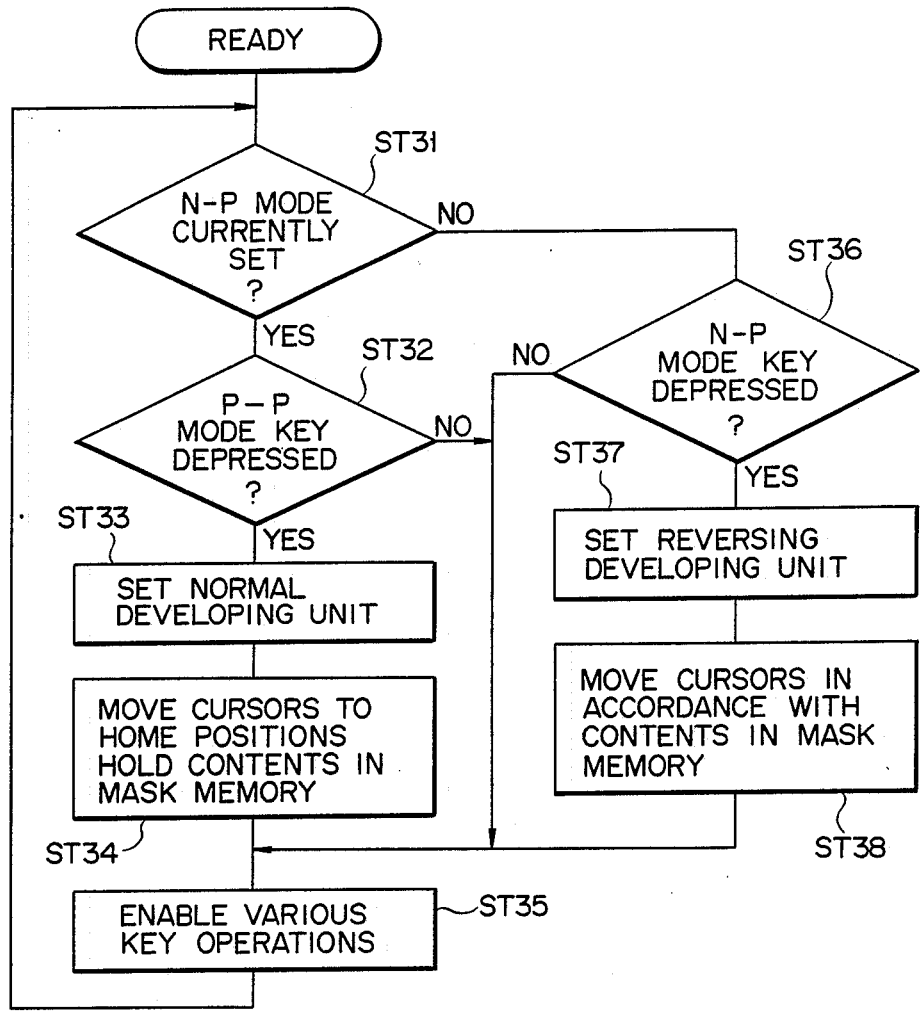
FIG. 13 is a flow chart for explaining an operation in a ready state.

Referring to FIG. 13, an operation to be performed when the microfilm reader/printer main body is set in the ready state will be described.

If, for example, P-P mode key 57B on panel 53 is depressed in the N-P mode, main control unit 64 determines that the N-P mode is to be switched to the P-P mode (steps ST31 and ST32) and controls switching circuit 78 so that normal developing unit 22 opposes photosensitive drum 20 and reversing developing unit 23 is moved away from drum 20 (step ST33).

Unit 64 moves cursors 35A, 35B, 36A and 36B and side shutters 47A and 47B to their initial positions and disables inputs from cursor operation keys 61A to 61D. However, the content of mask memory 64A, i.e., an area to be copied designated in a preceding N-P mode is held (step ST34).

Then, in accordance with an operation of copy start key 54 on panel 53, processing as shown in FIG. 10 is performed (step ST35).

If N-P mode key 57A on panel 53 is depressed in the P-P mode, unit 64 determines that the P-P mode is to be switched to the N-P mode (steps ST31 to ST36) and controls circuit 78 so that reversing developing unit 23 opposes drum 20 and normal developing unit 22 is moved away from drum 20 (step ST37).

Unit 64 moves cursors 35A, 35B, 36A and 36B in accordance with the contents of memory 64A so that an area to be copied designated in a preceding N-P mode is recovered on the display surface of screen 1C (step ST38). Unit 64 performs the processing shown in FIG. 10 in accordance with, e.g., an operation of key 54 on panel 53 (step ST35). At this time, if designation of the area to be copied is changed in accordance with operations of keys 61A to 61D, the contents of memory 64A are rewritten on the basis of the changed area to be copied.

If key 54 and the like on panel 53 are operated in the N-P mode, unit 64 continuously performs the processing in accordance with the key operations. In this case, development is performed using reversing developing unit 23 as a developing unit. At the same time, if designation of the area to be copied is changed in accordance with operations of keys 61A to 61D, the contents of memory 64A are rewritten on the basis of the changed area to be copied (steps ST36 to ST38, and ST35).

If key 54 and the like on panel 53 are operated in the P-P mode, unit 64 performs processing in accordance with the key operations (steps ST32 and ST35).

When the designated positions of the cursors are stored in memory 64A and then the P-P mode is switched to the N-P mode as described above, cursors 35A to 36B are automatically moved to predetermined positions in accordance with the contents of memory 64A. Therefore, a designation operation of the cursors can be omitted.

Figure 14:
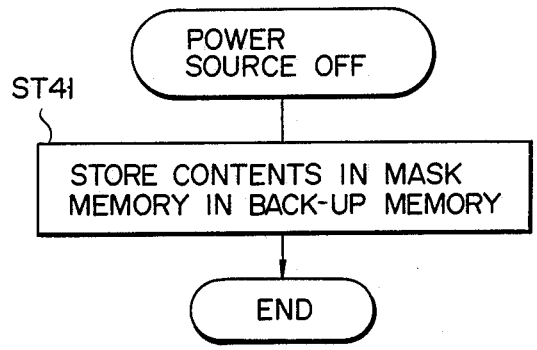
FIG. 14 is a flow chart for explaining an operation performed when the power source is switched off.

Referring to FIG. 14, an operation to be performed when the power source of the microfilm reader/printer main body is switched off will be described. When the power source of the reader/printer is switched off, unit 64 stores the contents stored in mask memory 64A, i.e., an area to be copied designated in a preceding N-P mode in backup memory 64B and then completes all the operations (step ST41).

As described above, when the power source of the microfilm reader/printer is switched off, the contents of memory 64A are stored in memory 64B to hold the designated positions of cursors 35A to 36B. Therefore, since an area to be copied need not be designated each time the power source is switched on/off in order to, e.g., release paper jamming, the operability is improved.

In the above description, cursors 35A to 36B are moved to designate an area to be copied by operating panel 53, thereby performing the copying operation to the area to be copied. However, designation of an area to be copied performed by cursors 35A to 36B and the copying operation to the area to be copied can be identically instructed by operation panel 101A of page searcher 101.

That is, page searcher 101 is connected to main body 1, and cursor operation keys 61A to 61D, copy start key 54, ten keys 55 and the like are mounted on page searcher 101. By operating these keys, all the operations can be performed using the page searcher.

Therefore, by only operating panel 101A mounted on page searcher 101, designation of an area to be copied of an image can be performed in addition to a series of operations such as a copy number setting operation and a copy start operation. Therefore, panel 53 of main body 1 need not be operated in order to designate an area to be copied, resulting in good operability.

What is claimed is:

1. An image formation apparatus comprising:
   recording means having an image;
   display means for displaying the image recorded in said recording means;
   designating means for designating an arbitrary area of said display means;
   first image-forming means for forming an image recorded on said recording means through first forming process;
   second image-forming means for forming an image recorded in said recording means through a second image forming process;
   selecting means for selecting said first image forming means or said second image forming means;
   memory means for storing information of the area designated by said designating means; and
   moving means for moving said designating means in accordance with information of the area stored in said memory means to display the area.

2. An apparatus according to claim 1, wherein said recording means comprises a microfilm having a negative image of a positive image thereon.

3. An apparatus according to claim 6, wherein said display means comprises a screen.

4. An apparatus according to claim 1, wherein said display means is rectangular and said designating means comprises cursors movable along adjacent sides of said display means.

5. An apparatus according to claim 1, wherein the first image forming means comprises means for forming a positive image using the negative image recorded on the recording means.

6. An apparatus according to claim 1, wherein the second image forming means comprises means for forming a positive image using the positive image recorded on the recording means.

7. An image formation apparatus comprising:
   display means for displaying display information;
   designating means for designating an arbitrary area of said display means;
   first operating means, mounted on said display means, for instructing a designated position of said designating means;
   changing means, connected to said display means, for changing the display information displayed on said display means; and
   second operating means, mounted on said changing means, for instructing a designated position of said designating means.

8. An apparatus according to claim 7, wherein the display information comprises information recorded in a microfilm.

9. An apparatus according to claim 7, wherein said display means comprises a screen.

10. An apparatus according to claim 7, wherein said display means is rectangular, and said designating means comprises cursors movable along adjacent sides of said display means.

11. An apparatus according to claim 7, wherein changing means comprises a page searcher.

12. An image formation apparatus comprising:
    recording means having an image recorded thereon;
    means for displaying the image recorded on said recording means;
    means for designating an arbitrary area of said displaying means;
    first memory means for storing information representing the arbitrary display area designated by the designating means;
    second memory means for storing the information transferred from the first memory means;
    a power source;
    means for transferring the information stored in the first memory means to the second memory means when the power source is switched off, and for transferring the information stored in the second memory means to the first memory means when the power source is switched on; and
    means for moving the designating means in accordance with the information stored in the first memory means to display the arbitrary display area when the power source is switched on.

13. An apparatus according to claim 12, wherein said recording means comprises microfilm.

14. An apparatus according to claim 12, wherein said display means comprises a screen.

15. An apparatus according to claim 12, wherein said displaying means is rectangular, and said designating means comprises cursors movable along adjacent sides of said displaying means.

16. An apparatus according to claim 12, wherein said first memory means comprises a volatile memory.

17. An apparatus according to claim 12, wherein said second memory means comrises a non-volatile memory;

18. An image formation apparatus comprising:
    recording means having a negative or a positive image thereon;
    means for displaying the image recorded on said recording means;
    means for designating an arbitrary area of said displaying means;
    first image forming means for forming a positive image using the negative image recorded on the recording means;
    second image forming means for forming a positive image using the positive image recorded on the recording means;
    first memory means for storing information representing the arbitrary display area designated by the designating means;
    second memory means for storing the information transferred from the first memory means;
    means for selecting said first forming means or said second forming means;

means for transferring the information stored in the first memory means to the second memory means when the second forming means is selected by the selecting means, and the information stored in the second memory means to the first memory means when the first forming means is selected by the selecting means; and means for moving said designating means in accordance with the information stored in said first memory means to display the arbitrary display area when said first forming means is selected by said selecting means;

19. An apparatus according to claim 18, wherein said recording means comprises microfilm.

20. An apparatus according to claim 18, wherein said display means comprises a screen.

21. An apparatus according to claim 18, wherein said display means is rectangular, and said designating means comprises cursors movable along adjacent sides of said display means.

22. An apparatus according to claim 18, wherein said first memory means comprises a volatile memory.

23. An apparatus according to claim 18, wherein said second memory means comprises a non-volatile memory.

* * * * *